US007053368B2

(12) United States Patent
Thakur

(10) Patent No.: US 7,053,368 B2
(45) **Date of Patent: *May 30, 2006**

(54) FOCUSING IONS USING GAS DYNAMICS

(75) Inventor: Rohan Thakur, San Jose, CA (US)

(73) Assignee: Thermo Finnigan LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/071,967

(22) Filed: Mar. 4, 2005

(65) Prior Publication Data

US 2005/0151074 A1 Jul. 14, 2005

Related U.S. Application Data

(63) Continuation of application No. 10/444,790, filed on May 23, 2003, now Pat. No. 6,872,940.

(60) Provisional application No. 60/384,649, filed on May 31, 2002.

(51) Int. Cl.
*B01D 59/44* (2006.01)
*H01J 49/00* (2006.01)

(52) U.S. Cl. ....................... 250/288; 250/281; 250/282

(58) Field of Classification Search ..................... None
See application file for complete search history.

(56) References Cited

U.S. PATENT DOCUMENTS 5,432,343 A * 7/1995 Gulcicek et al. ............ 250/288

* cited by examiner

*Primary Examiner*—Nikita Wells
(74) *Attorney, Agent, or Firm*—Charles B. Katz; Fish & Richardson P.C.

(57) ABSTRACT

Ion transfer assemblies and methods for directing ions from an ionization source to a mass analyzer. A first partition element separates a viscous flow region from a transition flow region. A second partition element separates the transition flow region into a first transition flow chamber and a second transition flow chamber. A focusing element defines a cavity shaped to direct a portion of a gas flow including ions entrained in a background gas from a first aperture in the first partition element towards a second aperture in the second partition element based on gas dynamics. The cavity is shaped to direct the gas flow without requiring the application of external electrostatic fields. Vents or slits can be provided in or between the first partition element and the focusing element to provide for expansion of the gas flow in the transition flow region.

7 Claims, 5 Drawing Sheets

FOCUSING IONS USING GAS DYNAMICS

CROSS-REFERENCE TO RELATED APPLICATIONS

This application is a continuation of U.S. application Ser. No. 10/444,790 entitled "Focusing Ions Using Gas Dynamics", filed May 23, 2003 now U.S. Pat. No. 6,872,940, which claims the benefit of Provisional Application No. 60/384,649, filed on May 31, 2002. Both of the foregoing applications are incorporated by reference herein.

BACKGROUND

The invention relates to ion transfer assemblies for directing ions from an atmospheric pressure ion source into a mass analyzer for analysis.

Atmospheric pressure ion sources coupled to mass spectrometers by an ion transfer assembly often produce random noise which can severely limit the signal-to-noise ratio in the mass spectra. This noise is believed to be caused by charged particles or clusters of ions and solvent molecules which reach the detector region at random times. The abundance of the noise can be affected by several parameters related to the ion source including spray stability, involatile buffer concentration, solvent flow, and sampling configuration. A variety of techniques have been devised to reduce the affect of such noise, as described, for example, in U.S. Pat. Nos. 6,392,225, 5,750,993, and 5,171,990, each of which is incorporated by reference herein.

SUMMARY

The invention provides ion transfer assemblies and methods for directing ions from an ionization source to a mass analyzer. In general, in one aspect, the assemblies include a first partition element (e.g., a skimmer) separating a viscous flow region from a transition flow region, a second partition element (e.g., a skimmer) separating the transition flow region into a first transition flow chamber and a second transition flow chamber, and a focusing element defining a cavity shaped to direct a portion of a gas flow including ions entrained in a background gas from a first aperture in the first partition element towards a second aperture in the second partition element based on gas dynamics, without requiring the application of external electrostatic fields. In some embodiments, vents or slits can be provided in or between the first partition element and the focusing element to provide for expansion of the gas flow in the transition flow region.

In general, in another aspect, the invention features an ion transfer assembly for directing ions from an ionization source to a mass analyzer. The assembly includes a gas dynamics focusing element located in a transition flow region. The gas dynamics focusing element is configured to receive from the ionization source a gas flow including ions and a background gas and transmit a portion of the gas flow for sampling into a molecular flow region. The gas dynamics focusing element includes one or more surfaces defining a cavity shaped to direct a portion of the gas flow along a center line based on local gas dynamics.

In general, in another aspect, the invention features methods for directing ions from an ionization source to a mass analyzer. The methods include receiving in a transition flow region a gas flow including ions entrained in a background gas, introducing at least a portion of the gas flow into a focusing element located in the transition flow region, and directing a portion of the gas flow along a center line for sampling into a molecular flow region. The focusing element including one or more surfaces defining a cavity. The gas flow is directed based on a local gas dynamics effect resulting at least in part from the shape of the cavity.

The invention can be implemented to provide one or more of the following advantages. Ions can be focused in the transition flow region, and the number of collisions between ions and background gases in that region increased, based on gas dynamics, without requiring the application of electrostatic potentials to increase ion kinetic energy. As a result, signal to noise ratios can be enhanced by reducing noise, enhancing signal, or a combination of both.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
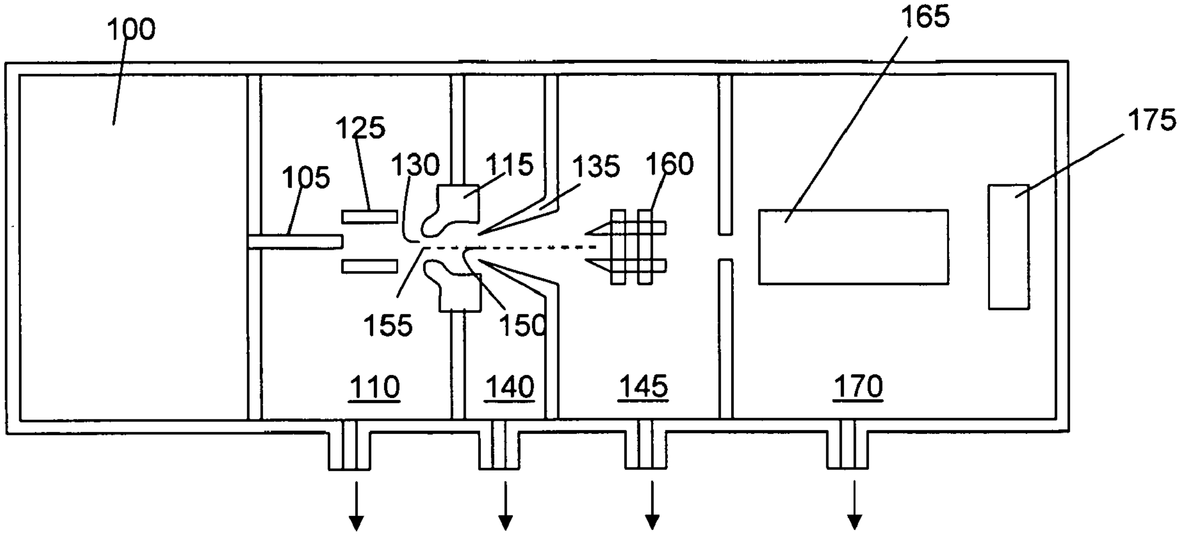
FIG. 1 is a schematic diagram illustrating an atmospheric pressure ionization source coupled to a mass analyzer by an ion transfer assembly.

One embodiment of an ion transfer assembly is illustrated in FIG. 1. An atmospheric pressure ionization source 100 is connected to receive a sample from an associated apparatus such as a liquid chromatograph or syringe pump. The atmospheric pressure ionization source can be an electrospray ionization source, an atmospheric pressure chemical ionization source, an atmospheric pressure matrix assisted laser desorption source, a photoionization source, or a source employing any other ionization technique that operates at pressures substantially above the operating pressure of the mass analyzer (e.g., from about 1 torr to about 760 torr). The source 100 forms ions representative of the sample, which ions are transported from the ion source to the mass analyzer by an ion transfer assembly. In particular, the ions are entrained in a background gas and transported from the ion source through a capillary 105 into a viscous flow chamber 110 which is maintained at a lower pressure (e.g., 0.5 to 10 torr) than the atmospheric pressure of the ionization source 100. Due to the differences in pressure, ions and gases are caused to flow through capillary 105 into the viscous flow chamber 110, where the ions and gases expand to form a supersonic free jet. The end of the capillary is opposite a first skimmer or partition element 115 that separates the viscous flow chamber 110 from a transition flow chamber 140, which is maintained at a lower pressure (e.g., from about 2 to about 400 millitorr) than viscous flow chamber 110. A tube lens 125 surrounds the end of capillary 105 and provides an electrostatic field that focuses the ion stream leaving capillary 105 through the aperture 130 in first skimmer 115, which is preferably displaced from the axis or cavity of the capillary 110. The operation of tube lens 125 is described in U.S. Pat. No. 5,157,260 which is incorporated by reference herein.

A second partition element or skimmer 135 is located proximate to first skimmer 115 and separates transition flow chamber 140 from a molecular flow chamber 145 that is preferrably maintained in the neighborhood of about $10^{-4}$ torr. Second skimmer 135 samples the ion stream exiting from aperture 130 in first skimmer 115. First skimmer 115 and second skimmer 135 are formed and positioned such that ions and gases transitioning from viscous to transition flow are focused based on the gas dynamics in the immediate vicinity. A portion of the background gases and a corresponding portion of the entrained ions are allowed to expand into transition flow chamber 140 where it is pumped away. However, the gas dynamics in the vicinity are such that a portion of the gases and ions are directed along center line 150. In particular, the first skimmer 115 is contoured to define a cavity formed to control the evacuation of background gases enabling gas flow focusing and allowing for the declustering process to continue beyond the electrostatic centering influence of the tube lens. Thus, the ion stream is focused along center line 150 without requiring any electrostatic potential to be applied to first skimmer 115 or second skimmer 135 (i.e., they can simply be grounded to the instrument chassis). Ions traveling through aperture 155 in second skimmer 135 are then directed by additional guide elements 160 (e.g., a multipole ion guide) into mass analyzer 165 disposed in high vacuum chamber 170, and, ultimately, to detector 175 whose output can be displayed as a mass spectrum. Preferably, the contoured back end of the first skimmer is formed to allow for just enough pumping so as not to allow a molecular gas beam to subsequently enter the high vacuum region, but to restrict the evacuation of background gases so as to allow for the influence of gas flow focusing to occur. Appropriate additional guide elements 160 can include additional skimmers or lenses, and preferably include RF-only optics, such as RF/DC quadrupoles, other multipoles or other optical devices. Mass analyzer 165 can be any mass analyzer or hybrid combination of mass analyzers, including quadrupole mass analyzers, ion trap mass analyzer (3D or linear 2D ion traps), time of flight mass analyzers, fourier transform mass analyzers, sector mass analyzers, orbitrap mass analyzers, or the like.

Figure 2:
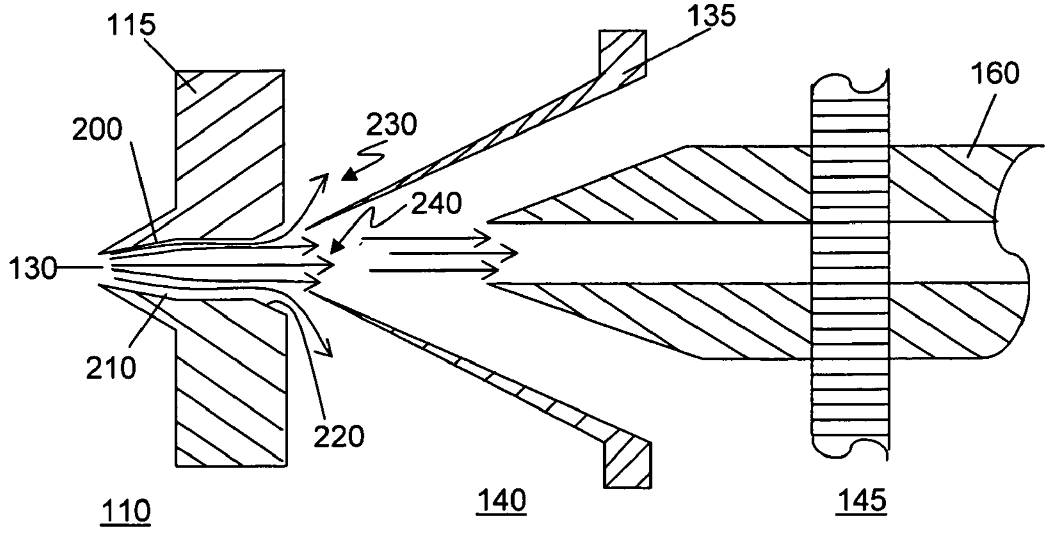
FIG. 2 illustrates one embodiment of an ion transfer assembly in more detail.

FIG. 2 illustrates one embodiment of an ion transfer assembly in more detail. As shown, first skimmer 115 includes interior surfaces 200, 210 and 220 that define a cavity extending from first aperture 130 along the direction of flow towards transition flow chamber 140. The region of this cavity immediately behind the first aperture 130 of the first skimmer 115 can be considered to fall technically in the viscous flow region, as the gas load has yet to experience the full extent of the pumping applied to evacuate transition flow chamber 140 so that transition flow conditions can established. The second skimmer 135 is formed to cooperate with the back end of the cavity in the first skimmer 115 (e.g., with an external cone angle that is complementarily shaped to the surface 220 in the embodiment of FIG. 2) and is positioned within the restricted evacuation zone of the cavity so as to sample an intermediate zone where the conditions of viscous flow are rapidly diminishing while those that describe transition flow conditions are being set up. Thus, the interior surfaces, and in particular cylindrical surface 210 and flared surface 220, are shaped to cooperate with second skimmer 135 to allow a portion 230 of ions and gases to expand into transition flow chamber 140, but to direct a portion 240 of ions and gases along center line 155 and into molecular flow chamber 145. Interior surfaces 210 and 220 thus form a gas dynamic focusing element that focuses the ion stream in the transition flow region without requiring the application of electrostatic potentials.

Figure 3:
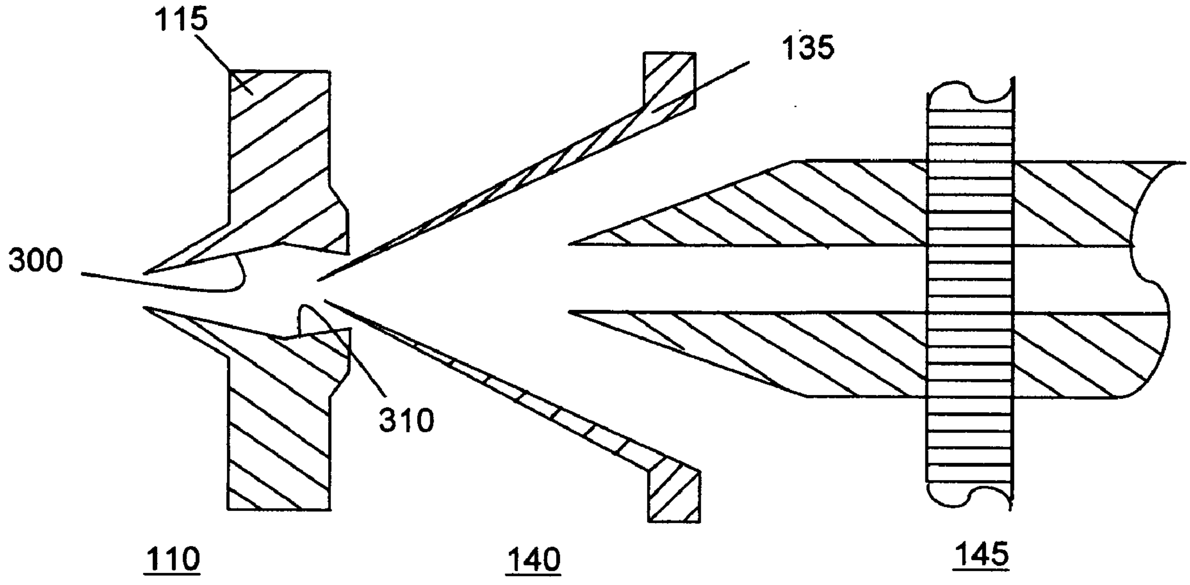
FIG. 3 illustrates a second embodiment of an ion transfer assembly in more detail.
Figure 4:
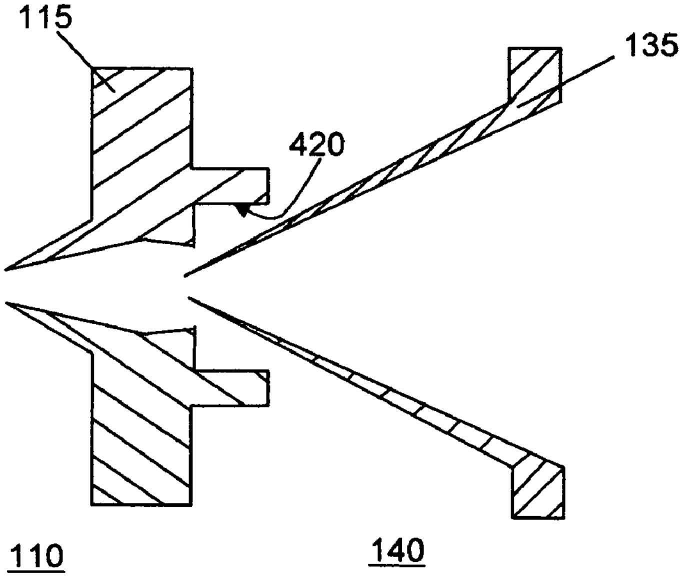
FIG. 4 illustrates a third embodiment of an ion transfer assembly in more detail.

A different embodiment is illustrated in FIG. 3. Like the embodiment of FIG. 2, a first skimmer 115 separates viscous flow region 110 from a transition flow chamber defined by first skimmer 115 and second skimmer 135. Again, first skimmer 115 includes interior surfaces, here surfaces 300 and 310, that define a cavity extending from the viscous flow region to the transition flow region. However, whereas in the embodiment of FIG. 2 the interior surface closest to transition flow chamber 140 and second skimmer 135 flared outward away from the center line, surface 310 has a conical (or frustoconical) shape, with a narrowing diameter along the direction of ion flow. Similarly, in a third embodiment illustrated in FIG. 4, additional interior surfaces 420 can be formed in first skimmer 115 to modify the structure of the internal cavity, and thereby modify the gas dynamics in the transition flow region. The particular number of interior surfaces, the contour of those surfaces (e.g., flat, rounded, etc.), and the orientation of those surfaces relative to the direction of ion flow can be optimized based on the particular application and on the structure of the second skimmer 135.

Figure 5:
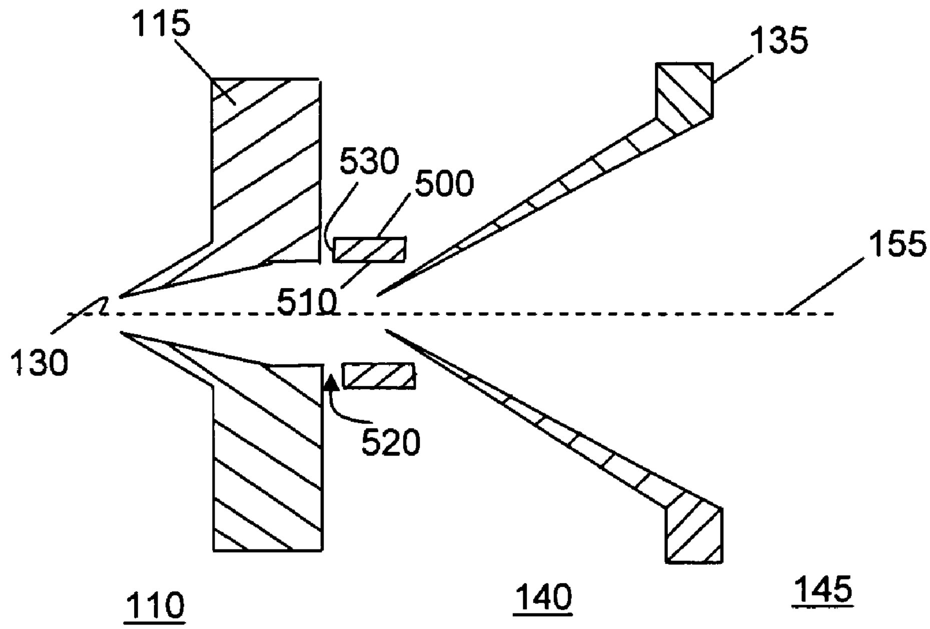
FIG. 5 illustrates a fourth embodiment of an ion transfer assembly in more detail.

Still another embodiment is illustrated in FIG. 5, in which additional gas dynamic focusing is provided by the addition of a focusing element 500 located along the center line between the first skimmer 115 and the second skimmer 135. Focusing element 500 is formed to define one or more interior surfaces 510 (e.g., a tube) that direct ions and gases exiting first aperture 130 along center line 155 and through the aperture in second skimmer 135. Focusing element is located relative to first skimmer 115 to define one or more vents or gaps 520, through which gas and ions can be allowed to expand before the ion stream enters focusing element 500. Preferably, focusing element 500 is provided with a front edge or edges 530 that are formed to minimize any turbulence in the gas flow. Focusing element 500 can thus be used to provide gas dynamic focusing in place of, or in addition to, interior surfaces defined in first skimmer 115 as described above. More generally, the internal surfaces and the cavity they form can be condered to form a focusing element, whether defined in first skimmer 115 as discussed above or as a separate element 500 as illustrated in FIG. 5.

Figure 6:
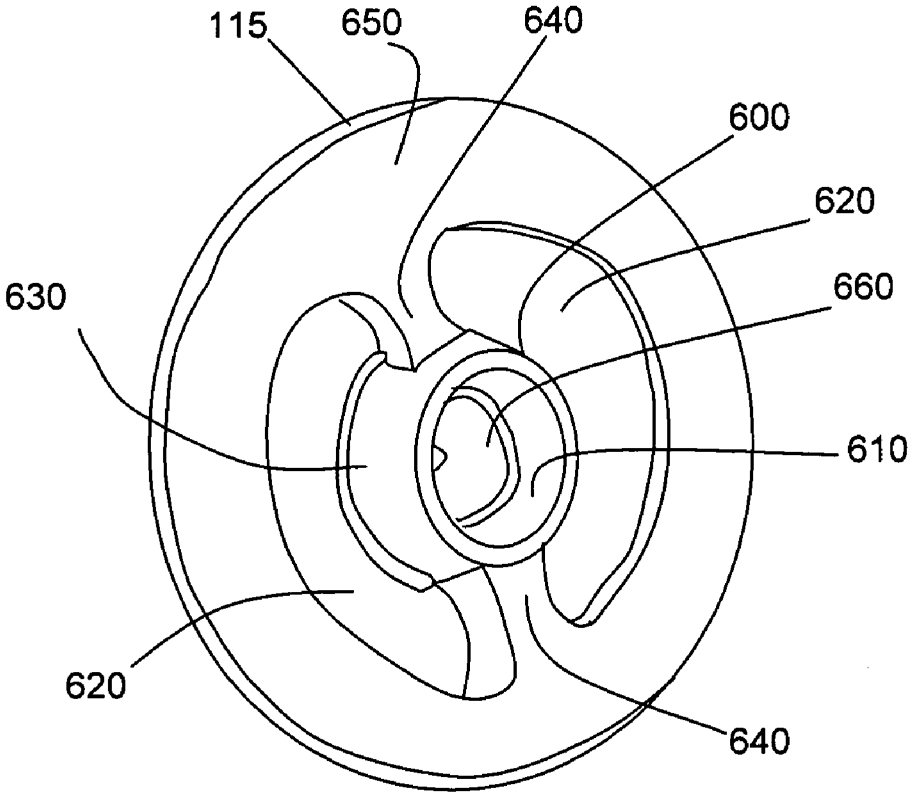
FIG. 6 illustrates a fifth embodiment of an ion transfer assembly in more detail.
Figure 7:
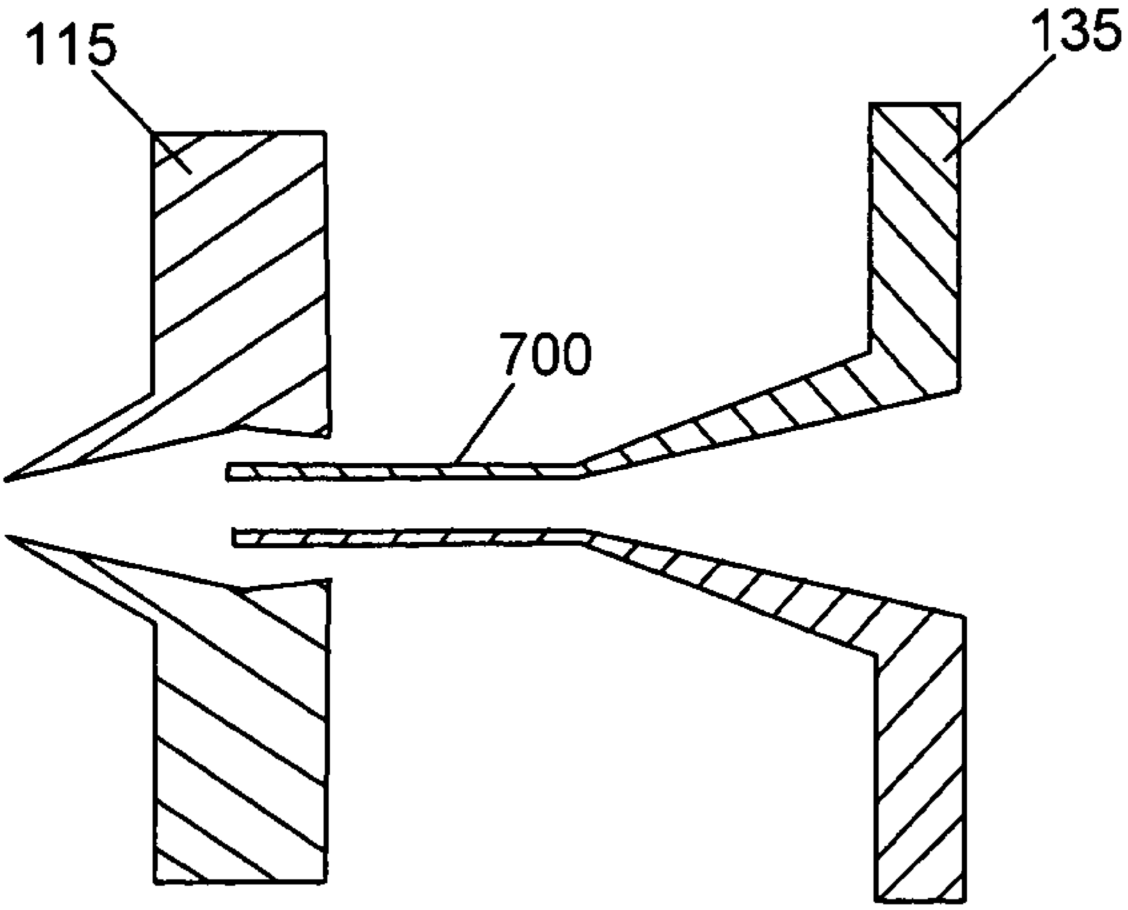
FIG. 7 illustrates a sixth embodiment of an ion transfer assembly in more detail.

Focusing element 500 can be a separate element, as illustrated in FIG. 5, or it can be connected to or formed integrally with first skimmer 115, as illustrated in FIG. 6, or second skimmer 135, as illustrated in FIG. 7. FIG. 6 provides a perspective view of the transition flow side of a first skimmer 115. Focusing element 600 is connected to first skimmer 115 by connecting portions 640, which define two cavities 620 in the rear face 650 of first skimmer 115. The internal cavity defined by interior focusing element surface 610 and interior skimmer surface 660 communicate with cavities 620 through circumferential slits 630 to allow ions and gases to expand into transition flow chamber 140 before the ion stream enters focusing element 600. In FIG. 7, focusing element 700 is shown integrally connected to second skimmer 135.

Without wanting to be bound by theory, it is believed that the combination of first skimmer 115 and second skimmer 135 enhances ion transmission along the center line and reduces noise by effectively disrupting gas expansion in the transition flow region. More specifically, it is believed that the focusing element's interior surface focuses the ion beam by directing both ions and background gas along the center line, thereby both increasing the number of ions transmitted through the transition flow region (i.e., decreasing the number of ions that would otherwise be pumped away in the transition flow region) and increasing the number of collisions between ions and gas in that region, which is believed to disrupt adducts or clusters that may contribute to chemical noise. Ions exiting the cavity formed by the focusing element continue in their stream lined paths in the core gas flow and are collisionally dampened to the center since the lighter background gases (e.g., predominantly nitrogen gas molecules) scatter to define the outer core boundary. As the restriction decreases over the length of the assembly due to the influence of the external cone angle of the second skimmer, the background gases are pumped away while the core of the beam enriched in ions is sampled by the second skimmer. This lowers the required aperture size of the second skimmer, thereby restricting the gas load into the subsequent optics.

Figure 8:
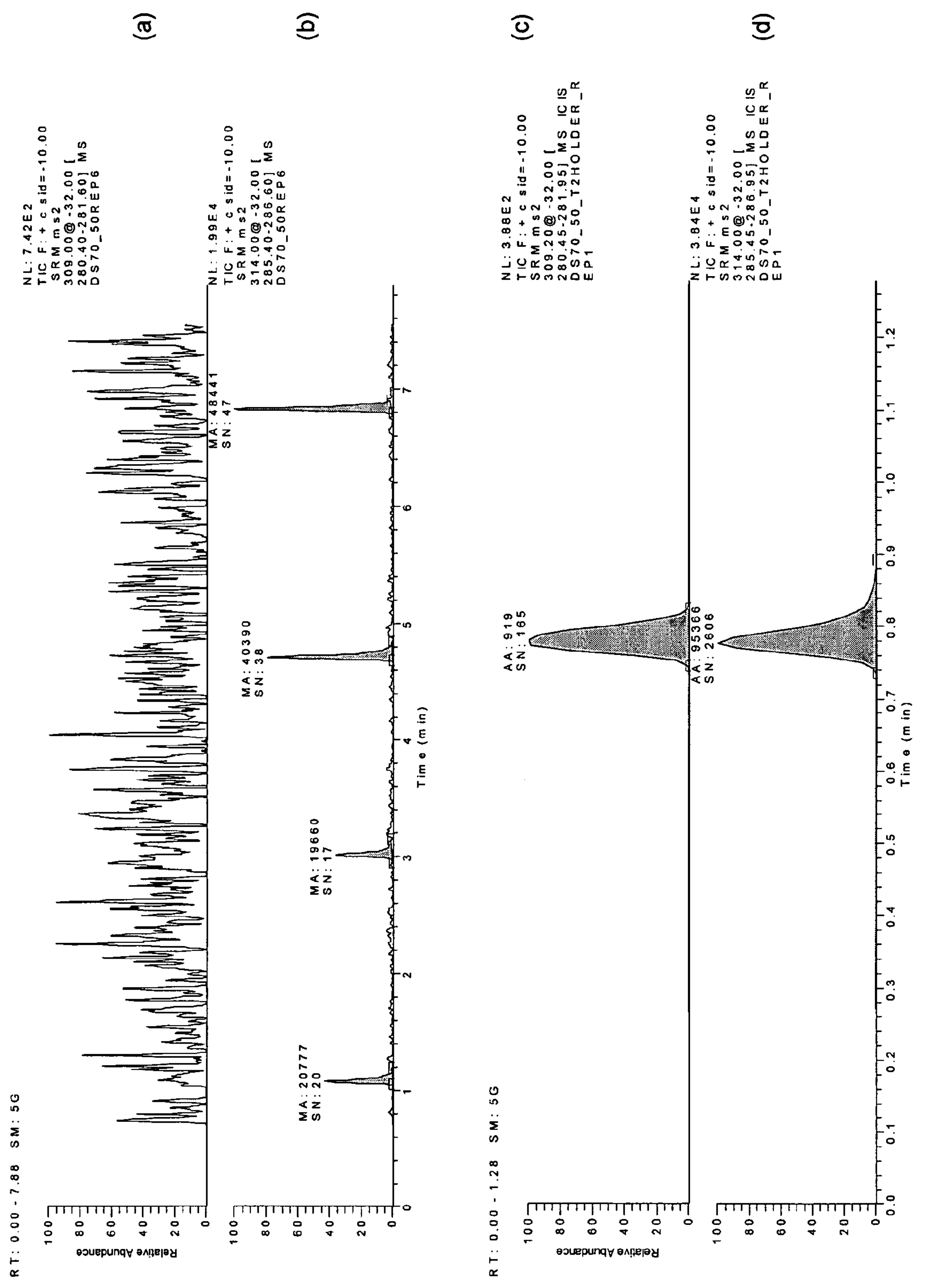
FIG. 8 illustrates an experiment illustrating a decrease in noise and an increase in signal resulting from gas dynamics focusing using one embodiment of an ion transfer assembly according to the invention.

FIG. 8 illustrates an experiment demonstrating the affect of gas dynamics focusing using an ion transfer assembly incorporating a focusing element as described above. FIGS. 8(*a*) and (*b*) show signal measured for a given sample and internal standard, respectively, in the absence of a focusing element as described above, and show that chemical noise overwhelms the signal. FIGS. 8(*c*) and (*d*) depict the results of an analysis of the same sample under identical conditions (i.e., same mobile phase, same column, etc.), and clearly distinguish the sample from noise (*c*), and show an approximately two-fold enhancement in signal observed for the internal standard (*d*).

A number of embodiments of the invention have been described. Nevertheless, it will be understood that various modifications may be made without departing from the spirit and scope of the invention. For example, while no electrostatic potential is applied to the partition and focusing elements in the described embodiments (and no such potential is required to achieve the focusing benefits of the invention), in some embodiments it may be desirable to apply a voltage to some or all of these elements to provide for further ion acceleration in the transition flow region. Accordingly, other embodiments are within the scope of the following claims.

What is claimed is:

1. A mass spectrometer system, comprising:

an ionization source for forming ions from a sample;

a passageway for transporting ions and background gas from the ionization source to a viscous flow region;

a first partition element separating the viscous flow region from a transition flow region, the first partition element having a first aperture communicating from the viscous flow region to the transition flow region for transmitting a gas flow including ions entrained in the background gas;

a focusing element located at least partially in the transition flow region and configured to receive at least a portion of a gas flow transmitted through the first aperture and to direct the gas flow through the transition flow region, the focusing element defining a generally cylindrical cavity extending along the direction of gas flow; and a mass analyzer, disposed in a high vacuum chamber, for measuring the mass-to-charge ratios of at least a portion of the ions.

2. The mass spectrometer system of claim 1, further comprising a second partition element separating the transition flow region from a molecular flow region, the second partition element having an aperture allowing passage of ions from the transition flow region into the molecular flow region.

3. The mass spectrometer system of claim 1, wherein no electrostatic potential is applied to the focusing element.

4. The mass spectrometer system of claim 1, wherein an ion signal generated by the mass spectrometer system representative of the abundance of ions formed from the sample is at least twice as large as an ion signal obtained in the absence of the focusing element.

5. An ion transfer assembly for directing ions from an ionization source to a mass analyzer, comprising:

a first partition element separating a viscous flow region from a transition flow region, the first partition element having a first aperture communicating from the viscous flow region to the transition flow region for transmitting a gas flow including ions entrained in the background gas; and a focusing element located at least partially in the transition flow region and configured to receive at least a portion of a gas flow transmitted through the first aperture and to direct the gas flow through the transition flow region, the focusing element defining a generally cylindrical cavity extending along the direction of gas flow.

6. The ion transfer assembly of claim 5, further comprising a second partition element separating the transition flow region from a molecular flow region, the second partition element having an aperture allowing passage of ions from the transition flow region into the molecular flow region.

7. The ion transfer assembly of claim 5, wherein no electrostatic potential is applied to the focusing element.

* * * * *